(12) United States Patent
Stroeters et al.

(10) Patent No.: US 6,570,375 B2
(45) Date of Patent: May 27, 2003

(54) WHEEL SPEED SENSOR WITH POSITIVE MOUNTING LATCH

(75) Inventors: Kurt H Stroeters, Clawson, MI (US); Loren M Trotter, Linden, MI (US); Richard P Burns, Rochester Hills, MI (US); Jay T TenBrink, Goodrich, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 95 days.

(21) Appl. No.: 09/802,249

(22) Filed: Mar. 8, 2001

(65) Prior Publication Data

US 2002/0125881 A1 Sep. 12, 2002

(51) Int. Cl.⁷ .............................. G01P 3/48; G01P 3/54; F16C 32/00
(52) U.S. Cl. .................... 324/173; 324/207.25; 384/448
(58) Field of Search .................... 324/207.2, 207.21, 324/207.25, 156, 173, 174; 439/744–749, 352, 489, 682, 620; 384/448

(56) References Cited

U.S. PATENT DOCUMENTS

| 3,934,685 A | 1/1976 | Jovick |
|---|---|---|
| 3,944,864 A | 3/1976 | Jovick |
| 3,969,033 A | 7/1976 | Recker |
| 4,013,954 A | 3/1977 | Deem et al. |
| 4,110,647 A | 8/1978 | Eslinger et al. |
| 4,544,220 A | * 10/1985 | Aiello et al. ................. 439/594 |
| 4,960,333 A | * 10/1990 | Faye et al. ................... 324/173 |
| 5,281,911 A | 1/1994 | Caron et al. |
| 5,291,130 A | 3/1994 | Kendzior |
| 5,296,805 A | 3/1994 | Clark et al. |
| 5,624,271 A | * 4/1997 | Childs et al. ................ 439/352 |
| 5,642,042 A | * 6/1997 | Goossens et al. ........... 324/173 |
| 5,647,772 A | 7/1997 | Martucci et al. |
| 5,716,233 A | 2/1998 | Muzslay |
| 5,920,193 A | 7/1999 | Tola et al. |

* cited by examiner

Primary Examiner—Jay Patidar
(74) Attorney, Agent, or Firm—Mark P. Calcaterra

(57) ABSTRACT

A wheel speed sensor latch for securing a wheel speed sensor to a bearing cap of a vehicle speed sensing assembly. The latch includes a main body having a collar section adapted for receiving the wheel speed sensor therethrough. The latch further includes a pair of bifurcated legs extending from the main body. The pair of bifurcated legs being engageable with a pair of latching members formed on the bearing cap such that the pair of latching members and the pair of bifurcated legs cooperate to secure the wheel speed sensor on the bearing cap.

12 Claims, 2 Drawing Sheets

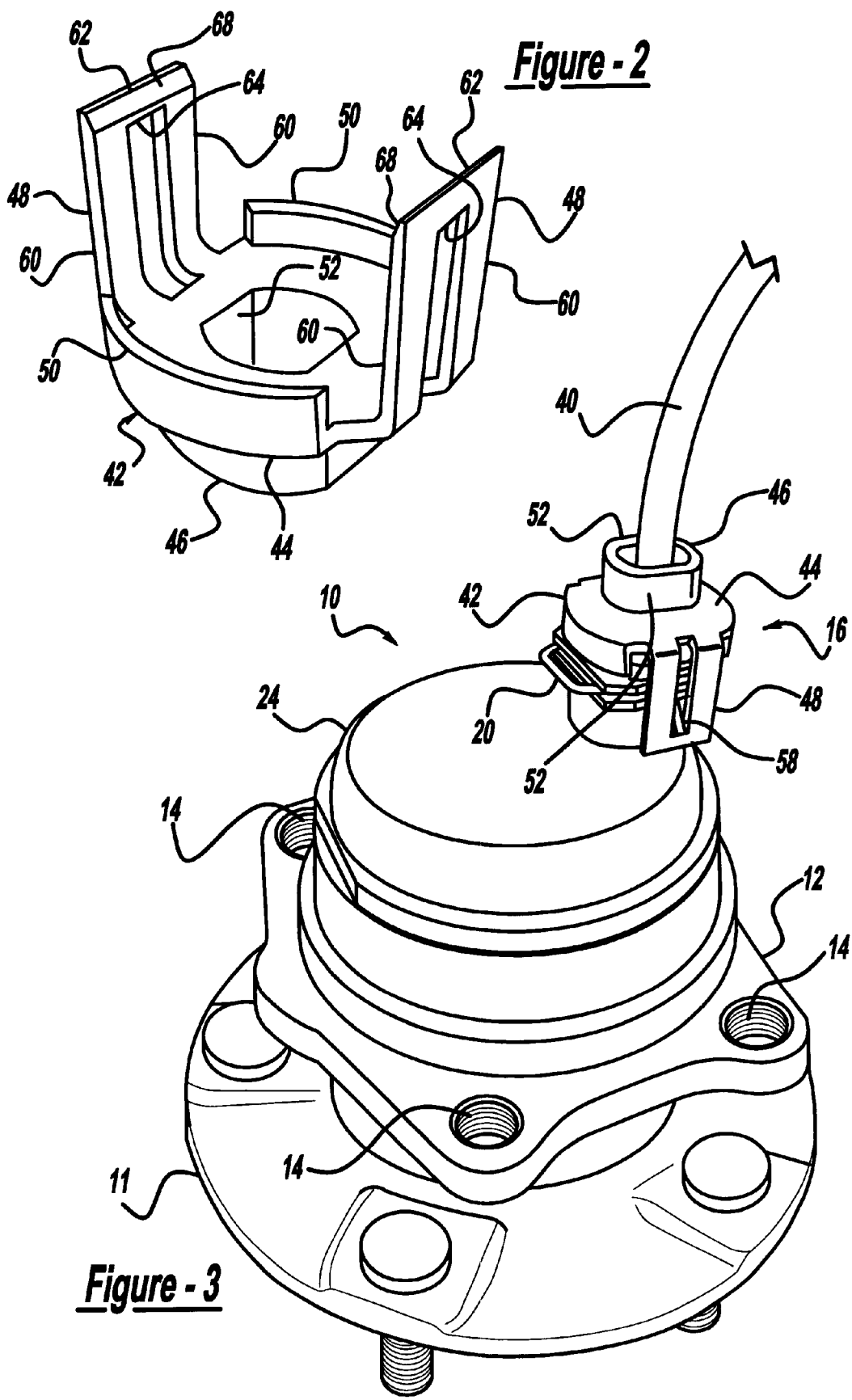

WHEEL SPEED SENSOR WITH POSITIVE MOUNTING LATCH

FIELD OF THE INVENTION

The present invention generally relates to a speed sensing assembly and, more particularly, to a sensor latch for ensuring proper positioning of a speed sensor within a speed sensing assembly.

BACKGROUND AND SUMMARY OF THE INVENTION

Speed sensing assemblies, which measure the rate of rotation of a vehicle wheel, are critical components of vehicle anti-lock braking systems, traction control systems, and the like. Speed sensing assemblies may be made as a one-piece assembly, which consists of a rotor which is mounted for rotation with the vehicle wheel and a stator that is generally mounted to the structure of the vehicle. The stator includes a bearing assembly which is adapted to rotatably receive the rotor therein. The stator assembly further includes a wheel speed sensing head or sensor which cooperates with the rotor to generate a pulsed output signal representative of wheel speed. It is imperative that the sensor be maintained in proper positioning relative to the rotor in order to ensure proper operation of the wheel speed sensor.

Frequently, speed sensing assemblies are manufactured and assembled at a location apart from the final assembly of the vehicle. This method allows the various mechanical and electrical connections to be tested prior to installation on the vehicle. However, occasionally it becomes necessary to assemble the various parts of the speed sensing assembly during the final assembly of the vehicle. For instance, it has recently become necessary to install the sensing head of the speed sensing assembly following installation of the main body within the vehicle. As a result, it has become more difficult to ensure that the sensor is properly seated within the speed sensor assembly to maintain reliable output of the pulsed signal.

Accordingly, there is a need in the relevant art to provide a method of ensuring proper installation of the sensor within the main body of the speed sensing assembly. Furthermore, there exists a need in the relevant art to provide a latching member which signals a positive connection with the main body of the speed sensor assembly. Still further, there exists a need in the relevant art to provide a positive latching member for a speed sensing assembly that overcomes the deficiencies of the prior art.

In accordance with the broad teachings of this invention, a positive sensor latch having an advantageous construction and method of assembly is provided. The latch includes a main body having a collar section adapted for receiving the wheel speed sensor therethrough. The latch further includes a pair of bifurcated legs extending from the main body. The pair of bifurcated legs being engageable with a pair of latching members formed on the bearing cap such that the pair of latching members and the pair of bifurcated legs cooperate to secure the wheel speed sensor on the bearing cap.

Further areas of applicability of the present invention will become apparent from the detailed description provided hereinafter. It should be understood that the detailed description and specific examples, while indicating preferred embodiments of the invention, are intended for purposes of illustration only.

BRIEF DESCRIPTION OF THE DRAWINGS

The present invention will become more fully understood from the detailed description and the accompanying drawings, wherein:

FIG. 2 is a perspective view of the sensor retaining latch according to the principles of the present invention; and FIG. 3 is an enlarged perspective view of the vehicle bearing assembly illustrating the sensor retaining latch in a latched position.

DETAILED DESCRIPTION OF THE PREFERRED EMBODIMENTS

Figure 1:
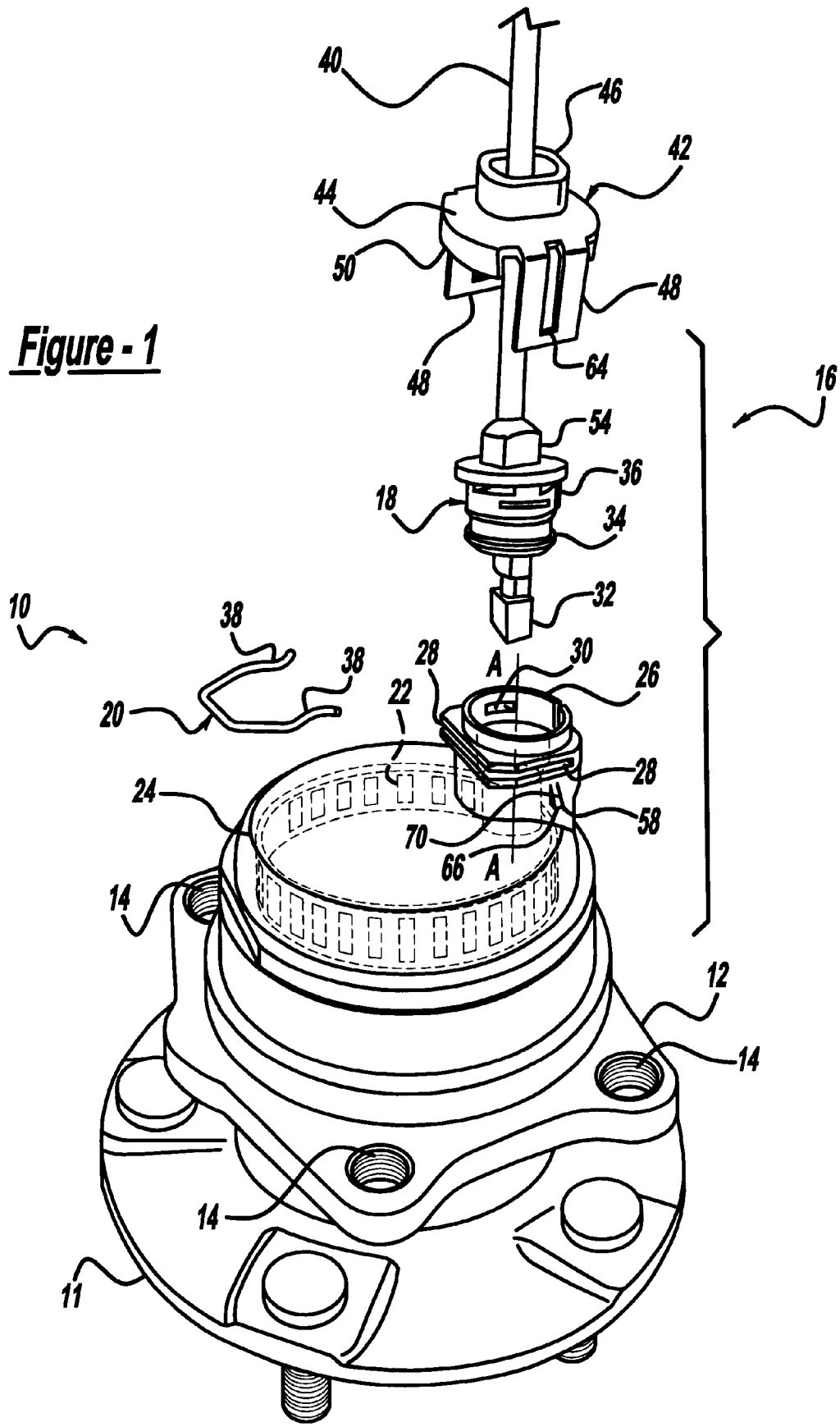
FIG. 1 is an exploded perspective view of a vehicle bearing assembly employing a sensor retaining latch according to the principles of the present invention.

The following description of the preferred embodiment is merely exemplary in nature and is in no way intended to limit the invention, its application, or uses.

Referring now to the drawings, a vehicle bearing assembly 10 is shown having a solid rotating spindle or shaft 11 surrounded by a cylindrical hub 12. Cylindrical hub 12 is fixed to the vehicle suspension via a plurality of threaded apertures 14 and corresponding fasteners (not shown). Vehicle bearing assembly 10 further includes an integrated wheel speed sensor assembly 16 having a wheel speed sensor 18 (FIG. 1), an optional spring clip 20, a tone wheel 22 fixed to spindle 11 for rotation therewith, and a bearing cap 24. Bearing cap 24 is generally dome shaped and includes an integrally-molded, sensor-receiving cavity 26 adapted to receive wheel speed sensor 18 therein. Sensor-receiving cavity 26 is generally cylindrical in shape and includes a pair of external slots 28 formed orthogonally to a longitudinal axis A—A of sensor-receiving cavity 26. Each of the pair of external slots 28 includes an elongated hole 30 (only one shown), which enables spring clip 20 to retain wheel speed sensor 18 within sensor-receiving cavity 26, which will be described below.

As best seen in FIG. 1, wheel speed sensor 18 includes a sensor probe 32, an O-ring seal 34, and a pair of retaining slots 36 (only one shown) formed on opposing sides of wheel speed sensor 18. During installation, a pair of retaining legs 38 of optional spring clip 20 extend through elongated holes 30 and are received within the pair of retaining slots 36 of wheel speed sensor 18 when wheel speed sensor 18 is disposed within sensor-receiving cavity 26.

Tone wheel 22 cooperates with wheel speed sensor 18 in a manner conventional in the art to produce an output signal representative of the wheel speed. A cable 40 interconnects wheel speed sensor 18 with a control device (not shown) for delivering the wheel speed data to the control device (i.e. vehicle computer), which is then capable of determining wheel slippage for use in anti-lock braking systems, traction control systems, and the like.

Recently, it has been found that spring clip 20 may not provide feedback to an installer of a proper positioning of wheel speed sensor 18 relative to sensor-receiving cavity 26 or tone wheel 22. That is, it has been found that in known designs wheel speed sensor 18 may be partially disposed within sensor-receiving cavity 26, however, spring clip 20 is locked around a lower section of wheel speed sensor 18 than retaining slots 36 thereby appearing to be properly positioned and seated. Conversely, wheel speed sensor 18 may be fully disposed within sensor-receiving cavity 26, yet not sufficiently retained by spring clip 20.

On the other hand, wheel speed sensor 18 may be sufficiently retained by spring clip 20, but improperly positioned in sensor-receiving cavity 26. Accordingly, sensor retaining latch 42 is disposed about wheel speed sensor 18 so as to effect a positive latch condition. That is, sensor retaining latch 42 insures wheel speed sensor 18 is properly positioned and seated by preventing latching of sensor retaining latch 42 until wheel speed sensor 18 is properly positioned and seated, thereby providing positive feedback to an installer that wheel speed sensor 18 has been installed properly.

Sensor retaining latch 42 includes a base section 44 and an upwardly-extending collar section 46. Sensor retaining latch 42 further includes a pair of downwardly-extending bifurcated legs 48 and a pair of downwardly-extending shoulders 50. Preferably, sensor retaining latch 42 is made of a plastic material. More preferably, sensor retaining latch 42 is made of a plastic material containing approximately 15% glass for improved strength and flex capabilities. Sensor retaining latch 42 may be manufactured simply employing conventional injection molding techniques. To facilitate inspection and confirmation of installation, sensor retaining latch 42 is preferably yellow or any other bright color.

Base section 44 of sensor retaining latch 42 and upwardly-extending collar section 46 cooperate to define a through bore sufficiently sized to receive wheel speed sensor 18 therethrough. Specifically, collar section 46 is generally cylindrical in shape having a pair of opposing flat sections 52. Flat sections 52 of collar section 46 are sized to cooperate with a corresponding pair of opposing flat sections 54 on wheel speed sensor 18. Such flat sections 52, 54 prevent rotation of sensor retaining latch 42 and wheel speed sensor 18 relative to each other.

As seen in the figures, downwardly-extending bifurcated legs 48 engage a pair of suitably sized latch nubs 58 extending from a lower exterior section of sensor-receiving cavity 26. Specifically, bifurcated legs 48 each include a pair of side members 60 extending from base section 44. Side members 60 terminate into an interconnecting member 62. Interconnecting member 62 includes a generally flat top surface 64 for engaging a lower surface 66 of latch nub 58. Likewise, interconnecting member 62 further includes a chamfered or otherwise inclined or tapered edge 68, which is adapted to ride along a tapered top surface 70 of latch nub 58 during an engaging motion. When fastened, each latch nub 58 extends between side members 60 and engages generally flat top surface 64 of interconnecting member 62.

As described above, bifurcated legs 48 are adapted to ride over latch nubs 58 during installation and, thus, must flex a sufficient distance to enable such passing. However, it should be appreciated that bifurcated legs 48 must also maintain sufficient bias to maintain a latch position once engaged.

During installation, wheel speed sensor 18 is inserted within sensor-receiving cavity 26 such that O-ring seal 34 of wheel speed sensor 18 is firmly seated within sensor-receiving cavity 26. The pair of retaining slots 36 of wheel speed sensor 18 are aligned with the pair of external slots 28 and elongated holes 30 of sensor-receiving cavity 26. Spring clip 20 may optionally be engaged with wheel speed sensor 18 such that retaining legs 38 of spring clip 20 extend through elongated holes 30 and lock within the pair of retaining slots 36 of wheel speed sensor. Sensor retaining latch 42 is then engaged with latch nubs 58. Specifically, sensor retaining latch 42 is pressed downward such that tapered edge 68 of bifurcated legs 48 rides along tapered top surface 70 of latch nub 58. This movement forces bifurcated legs 48 to flex outwardly until generally flat top surface 64 engages lower surface 66 of latch nub 58 and flexes inwardly to an engaged position. This latching motion produces a click or similar positive locking feedback to the installer to insure proper locking of wheel speed sensor 18 within sensor-receiving cavity 26.

It has been found that the sensor retaining latch of the present invention provides simple and reliable latching of the wheel speed sensor within the sensor-receiving cavity even when only one bifurcated leg is engaged with the corresponding latch nub. Therefore, should the installer inadvertently latch only one side of the sensor retaining latch, the wheel speed sensor will remain in proper position for determining wheel speed and, thus, permits optimal signal generation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for latching a wheel speed sensor to a bearing cap of a vehicle speed sensing assembly, said apparatus comprising:

a main body having a collar section having a bore adapted for receipt of a portion of the wheel speed sensor, the bore including opposed surfaces adapted to abut mating surfaces on the portion of the wheel speed sensor so as to prevent rotation of the wheel speed sensor with respect to the main body; and a pair of bifurcated legs extending from said main body, said pair of bifurcated legs being engagable with a pair of latching members formed on the bearing cap such that said pair of latching members and said pair of bifurcated legs cooperate to retain the wheel speed sensor with the bearing cap.

2. The apparatus according to claim 1 wherein said pair of bifurcated legs each comprise:

a pair of side members integrally formed with said main body; and an end member interconnecting said pair of side members, said end member directly engageable with at least one of said pair of latching members.

3. The apparatus according to claim 2 wherein said end member comprises:

a generally flat surface engageable with one of said pair of latching members; and a tapered surface opposite from said generally flat surface, said tapered surface adapted to slide over one of said pair of latching members.

4. The apparatus according to claim 1, further comprising:

a shoulder section downwardly-extending from said main body, said shoulder section adapted to generally enclose a portion of the bearing cap when said pair of bifurcated legs engage said pair of latching members.

5. A wheel speed sensor assembly comprising:

a bearing cap having an integrally formed sensor-receiving cavity;

at least one latching member extending from said bearing cap;

a wheel speed sensor disposed within said sensor-receiving cavity; and a sensor retaining latch operable for securing said wheel speed sensor within said sensor-receiving cavity, said sensor retaining latch having a main body and at least one bifurcated leg extending from said main body, said at least one bifurcated leg engaging said at least one latching member when said wheel speed sensor is within said sensor-receiving cavity, said main body further including a bore adapted for receipt of a portion of the wheel speed sensor, the bore including opposed substantially flat surfaces adapted to engage mating flat surfaces on the portion of the wheel speed sensor so as to prevent rotation of the wheel speed sensor relative to the main body.

6. The wheel speed sensor assembly according to claim 5 wherein said at least one bifurcated leg comprises:

a pair of side members integrally formed with said main body; and an end member interconnecting said pair of side members, said end member operable to engage said at least one latching member to secure said wheel speed sensor within said sensor-receiving cavity.

7. The wheel speed sensor assembly according to claim 6 wherein said end member comprises:

a generally flat surface engageable with said at least one latching member; and a tapered surface opposite from said generally flat surface, said tapered surface sliding over said at least one latching member during installation of said sensor retaining latch.

8. The wheel speed sensor assembly according to claim 5, further comprising:

an O-ring seal coupled to said wheel speed sensor, said O-ring seal engaging a surface within said sensor-receiving cavity.

9. The wheel speed sensor assembly according to claim 5, further comprising:

a bearing cap slot formed in said bearing cap, said bearing cap slot being open to said sensor-receiving cavity;

a sensor slot formed in a side of said wheel speed sensor, said sensor slot being substantially aligned with said bearing cap slot when said wheel speed sensor is disposed within said sensor-receiving cavity; and a spring clip positioned in said bearing cap slot and engaging said sensor slot for retaining said wheel speed sensor within said sensor-receiving cavity.

10. A sensor positive latch for retaining a wheel speed sensor within a bearing cap of a vehicle speed sensing assembly, said sensor positive latch comprising:

a main body having a collar section having a bore adapted for receipt of a portion of the wheel speed sensor, the bore including opposed flat surfaces adapted to abut mating flat surfaces on the portion of the wheel speed sensor so as to prevent rotation of the wheel speed sensor with respect to the main body;

a pair of side members integrally formed with said main body;

an end member interconnecting said pair of side members, said end member adapted to be directly engagable with a latching hub protruding from a surface of the bearing cap to retain the wheel speed sensor with the bearing cap; and a shoulder section downwardly-extending from said main body, said shoulder section adapted to generally enclose a portion of the bearing cap when said end member engages said latching hub.

11. The sensor positive latch according to claim 10 wherein said end member comprises:

a generally flat surface engageable with one of said pair of latching members; and a tapered surface opposite from said generally flat surface, said tapered surface adapted to slide over one of said pair of latching members.

12. The sensor positive latch according to claim 10 being made of glass-filled plastic.

* * * * *